(12) United States Patent
Girdler et al.

(10) Patent No.: US 7,827,063 B2
(45) Date of Patent: Nov. 2, 2010

(54) POINT OF SALE SYSTEMS AND METHODS

(75) Inventors: Geoffrey Girdler, Villa Rica, GA (US); Graham Worsfold, Lakefield (CA); David Halyk, Delaware (CA); Arthur Sullivan, Suwanee, GA (US)

(73) Assignee: DigiPoS Store Solutions Group Limited (GB)

( * ) Notice: Subject to any disclaimer, the term of this patent is extended or adjusted under 35 U.S.C. 154(b) by 1251 days.

(21) Appl. No.: 10/852,466

(22) Filed: May 24, 2004

(65) Prior Publication Data

US 2005/0261981 A1    Nov. 24, 2005

(51) Int. Cl.
*G06Q 20/00* (2006.01)
(52) U.S. Cl. .............. 705/16; 710/1; 709/208; 361/676; 361/687
(58) Field of Classification Search .............. 705/16; 710/1; 361/676, 687; 709/208
See application file for complete search history.

(56) References Cited

U.S. PATENT DOCUMENTS

| | | | | |
|---|---|---|---|---|
| 4,114,601 A | * | 9/1978 | Abels | 600/20 |
| 4,912,600 A | * | 3/1990 | Jaeger et al. | 361/700 |
| 5,131,233 A | * | 7/1992 | Cray et al. | 62/64 |
| 5,190,059 A | * | 3/1993 | Fabian et al. | 128/899 |
| 5,895,452 A | * | 4/1999 | Lum | 705/16 |
| 5,903,876 A | * | 5/1999 | Hagemier | 705/19 |
| 5,931,824 A | * | 8/1999 | Stewart et al. | 604/358 |
| 5,953,707 A | * | 9/1999 | Huang et al. | 705/10 |
| 6,003,016 A | * | 12/1999 | Hagemier | 705/19 |
| 6,076,007 A | * | 6/2000 | England et al. | 600/424 |
| 6,078,899 A | * | 6/2000 | Francisco et al. | 705/19 |
| 6,272,529 B1 | * | 8/2001 | Lum | 709/203 |
| 6,366,206 B1 | * | 4/2002 | Ishikawa et al. | 340/573.1 |
| 6,400,272 B1 | * | 6/2002 | Holtzman et al. | 340/572.1 |
| 6,424,262 B2 | * | 7/2002 | Garber et al. | 340/572.3 |
| 6,438,528 B1 | * | 8/2002 | Jensen et al. | 705/44 |
| 6,546,373 B1 | * | 4/2003 | Cerra | 705/19 |
| 6,546,441 B1 | * | 4/2003 | Lum | 710/72 |
| 6,567,262 B2 | * | 5/2003 | Meir | 361/676 |
| 6,600,418 B2 | * | 7/2003 | Sainati et al. | 340/572.1 |

(Continued)

OTHER PUBLICATIONS

Enticknap, Nicholas "A Docklands room without a view", Nov. 9, 1989, Computer Weekly, n1189, pp. 30.*

(Continued)

*Primary Examiner*—Matthew S Gart
*Assistant Examiner*—Talia Crawley
(74) *Attorney, Agent, or Firm*—The Law Firm of H. Dale Langley, Jr. PC (57) ABSTRACT

A point of sale device includes a point of sale functional component, such as, for example, a display, an input device, a printer, scales, a card reader, or other. An interface is connected to the component, through a standard port of the component. The interface includes a radio frequency communications function. The interface communicates information regarding the component over a wireless communication network. The wireless communication network connects to a maintenance gateway for the device, either via the network, other networks, or by other communicative connection. The device can be monitored and maintained by the maintenance gateway, and the maintenance gateway can be located at a remote location from the device. The interface can also include cooling elements and controls for the device and/or the interface.

23 Claims, 5 Drawing Sheets

U.S. PATENT DOCUMENTS

| | | | |
|---|---|---|---|
| 6,640,214 B1* | 10/2003 | Nambudiri et al. | 705/26 |
| 6,669,089 B2* | 12/2003 | Cybulski et al. | 235/385 |
| 6,687,122 B2* | 2/2004 | Monfarad | 361/679.54 |
| 6,768,419 B2* | 7/2004 | Garber et al. | 340/572.4 |
| 6,772,603 B2* | 8/2004 | Hsu et al. | 62/259.2 |
| 6,809,645 B1* | 10/2004 | Mason | 340/572.1 |
| 6,809,928 B2* | 10/2004 | Gwin et al. | 361/699 |
| 6,826,047 B1* | 11/2004 | Chen et al. | 361/687 |
| 6,845,363 B1* | 1/2005 | Matsubara et al. | 705/16 |
| 6,861,954 B2* | 3/2005 | Levin | 340/572.1 |
| 6,865,077 B2* | 3/2005 | Igarashi | 361/687 |
| 6,900,731 B2* | 5/2005 | Kreiner et al. | 340/572.1 |
| 7,010,507 B1* | 3/2006 | Anderson et al. | 705/31 |
| 7,013,959 B2* | 3/2006 | Lee et al. | 165/104.33 |
| 7,019,650 B2* | 3/2006 | Volpi et al. | 340/572.1 |
| 7,123,375 B2* | 10/2006 | Nobutani et al. | 358/1.15 |
| 7,137,015 B2* | 11/2006 | Su | 713/300 |
| 7,142,118 B2* | 11/2006 | Hamilton et al. | 340/572.1 |
| 7,155,402 B1* | 12/2006 | Dvorak | 705/10 |
| 7,177,829 B1* | 2/2007 | Wilson et al. | 705/31 |
| 7,203,728 B2* | 4/2007 | Lum | 709/208 |
| 7,256,998 B2* | 8/2007 | Chou et al. | 361/698 |
| 7,307,530 B2* | 12/2007 | Fabian et al. | 340/572.1 |
| 7,557,710 B2* | 7/2009 | Sanchez et al. | 340/572.1 |
| 2001/0047445 A1* | 11/2001 | Lum | 710/129 |
| 2002/0067263 A1* | 6/2002 | Tafoya et al. | 340/572.1 |
| 2002/0143320 A1* | 10/2002 | Levin | 606/1 |
| 2003/0066537 A1* | 4/2003 | Fabian et al. | 128/899 |
| 2003/0079058 A1* | 4/2003 | Lum | 710/1 |
| 2003/0105394 A1* | 6/2003 | Fabian et al. | 600/407 |
| 2004/0084525 A1* | 5/2004 | Kreiner et al. | 235/384 |
| 2004/0122738 A1* | 6/2004 | Lum | 705/21 |
| 2004/0129279 A1* | 7/2004 | Fabian et al. | 128/899 |
| 2004/0201479 A1* | 10/2004 | Garber et al. | 340/572.1 |
| 2004/0250819 A1* | 12/2004 | Blair et al. | 128/899 |
| 2007/0093709 A1* | 4/2007 | Abernathie | 600/407 |
| 2007/0290030 A1* | 12/2007 | Fox et al. | 235/375 |

OTHER PUBLICATIONS

Pump Station Serves Large Glycol-Cooled Computer Sites, Hiross News Release, Jun. 29, 1988.*

* cited by examiner

POINT OF SALE SYSTEMS AND METHODS

BACKGROUND OF THE INVENTION

The present invention generally relates to information systems and, more particularly, relates to point of sale information technology and computing network systems and methods having open architecture and compatibilities, environmental protections, and monitoring features.

Computers, communications networks, and related processing and communicative technologies have been employed to provide point of sale systems. These point of sale systems have been employed, for example, in retail sales and supplier applications, for registering, recording, inventorying, and consummating sales to the customer at the "point of sale" location for the systems. Point of sale solutions have typically been based on proprietary technologies, including proprietary software and hardware. Moreover, the conventional solutions have been limited with respect to maintainability, upgrade, compatibility, functionality, and update.

Particularly, with respect to point of sale devices of the systems, environmental conditions can prove problematic. Specific point of sale devices are often located in cramped spaces, without sufficient ventilation, and lack easy accessibility. Overheating of devices has occurred. Additionally, accessibility and other limitations make upgrade, update, and maintenance particularly cumbersome and economically pricey.

Furthermore, adaptation, replacement and advances in new technologies of equipment and operations are restricted with the conventional point of sale systems. Beyond the proprietary nature, and the applicable limitations because of such nature, the operations and functionalities of individual point of sale devices and the like have been relatively specific for particular hardware and software configuration and arrangements, including system architectures, operational systems, and layout locations. Integration of individual point of sale devices, as well as swapping, upgrades, and other replacement, addition and adaptation of such devices, both as to functionality and particular equipment and software, has been limited. This has increased the true cost of ownership and reduced benefits.

It would be a significant improvement in the art and technology to provide improved point of sale systems and methods that overcome the problems and limitations of conventional technology. It would also be an improvement to provide point of sale systems and methods that are readily adaptable and upgradeable to new and improved technologies, features, and applications. Further, it would be an improvement to provide environmental protections and monitoring for such systems and methods. The present invention provides numerous advantages and improvements, including improvements and nuances in the foregoing respects.

SUMMARY OF THE INVENTION

An embodiment of the invention is a system including a communications network, a communicative device, and an interface communicatively connected to the communicative device and the communications network.

Another embodiment of the invention is a method of selling including locating a functional device at a point of sale, connecting the functional device at the point of sale to an interface, and connecting the interface to a wireless communications network.

Yet another embodiment of the invention is a point of sale device, including a point of sale functional component, an interface connected to the component, and a wireless communication network connected to the interface, for wireless communications to and from the interface.

Another embodiment of the invention is a method of selling, including locating a sale function component at a point of sale and wirelessly monitoring a state of the component.

A further embodiment of the invention is a cooler, including a circuit, a power source connected to the circuit, a heat sink connected to the circuit, a first fan connected to the circuit, to direct airflow to towards the heat sink, and a second fan connected to the circuit, to direct airflow away from the heat sink.

Another embodiment of the invention is a method of cooling, including first staging in response to an indicator of an ambient temperature of the device, second staging in response to an indicator of an excess temperature exceeding the ambient temperature of the device and not exceeding an overheat temperature of the device, third staging in response to an indicator of in excess of the overheat temperature and not exceeding a damage temperature of the device, fourth staging in response to an indicator of in excess of the damage temperature and less than a back-up temperature of the device, and fifth staging in response to an indicator of at least the back-up temperature of the device.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
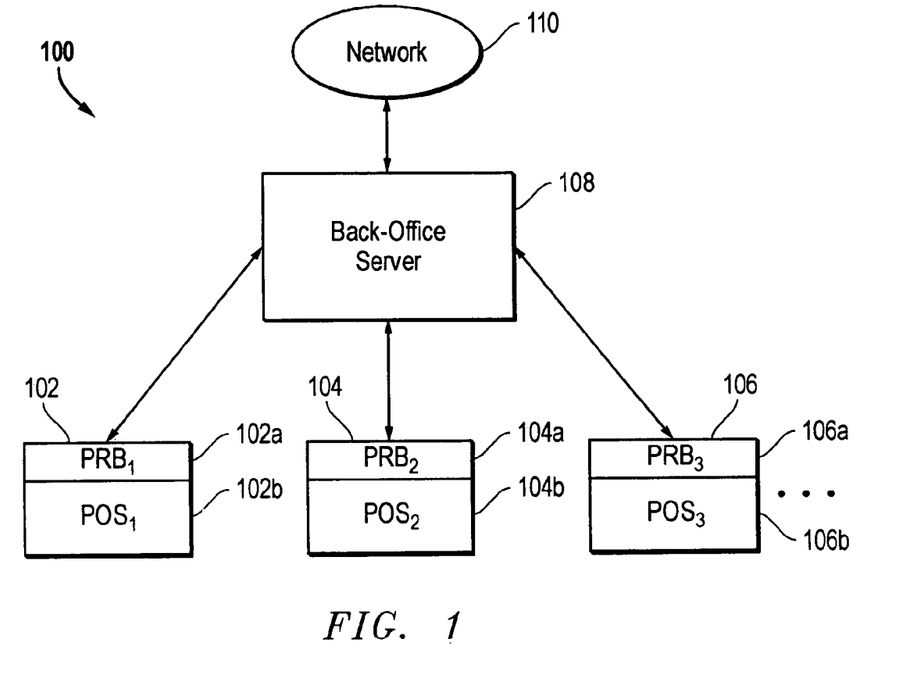
FIG. 1 illustrates a point of sale communications system, including several point of sale wireless interface devices for connecting to respective sale functional components, for example, printers, displays, input devices, scales, card readers, and others, and the interface for each such device is capable of wireless communications over a wireless network, for purposes of maintenance, monitoring, download, upload, upgrade and others, according to certain embodiments of the invention.

Referring to FIG. 1, a point of sale system 100 includes a first point of sale device 102, a second point of sale device 104, and a third point of sale device 106. Each device 102, 104, 106 is communicatively connected to a back-office server 108. The server 108 can be connected to other communications networks, such as the Internet or other network 110.

Each device 102, 104, 106 is a communications device capable of communicating to and from the server 108. The devices 102, 104, 106 are each located at respective customer points of sale, such as, for example, at a retail store site. The devices 102, 104, 106 include, without limitation, customer displays, processors, printers, scales, computers, MSR, and any of a wide variety of other and additional possible point of sale elements and components. The communicative connections between each device 102, 104, 106 and the server 108 are wired or wireless channels and links.

Communications over the connective links conform to any of a wide variety of analog or digital signals, or combinations thereof. In certain embodiments, the communications are digital packetized signals that conform to network protocols, for example, Transport Control Protocol/Internet Protocol (TCP/IP) or other. The devices 102, 104, 106 each can perform one or more point of sale functions, for example, sale reporting, consummation, receipt printing, and any of a wide variety of other possibilities. The devices 102, 104, 106 communicate point of sale information to the server 108, and the server 108 serves back-office functions.

Although the devices 102, 104, 106 and the server 108 are each illustrated in the Figure as single and independent devices, it is intended and to be understood that multiples, combinations, alternatives, and additions are possible in each instance. Particularly, the system 100 can include fewer, additional and others of a wide variety of the devices 102, 104, 106, and the three such devices are illustrated in FIG. 2 merely for purposes of example. The devices 102, 104, 106 and the server 108 serve to provide generalized functionalities of point of sale operations at a point of sale, with back-office accounting, inventory, recording, and storage at the point of sale and also in a centralized arrangement for all points of sale in the arrangement. Of course, each of the devices 102, 104, 106 and the server 108 can each be comprised, in implementation, of any of a wide variety of devices and components for providing the generalized functionalities as described.

Each point of sale device 102, 104, 106 comprises a passive retail backplane 102a, 104a, 106a, respectively, connected to a point of sale engine 102b, 104b, 106b, respectively. Each passive retail backplane 102a, 104a, 106a is communicatively connected to the server 108, for example, by direct wire, wireless channel, or combinations. The respective point of sale engines 102b, 104b, 106b each connect to the respective passive retail backplanes (PRB) 102a, 104a, 106a. Each PRB 102b, 104b, 106b is a motherboard/mothercard on a single chassis, that interfaces to provide connectivity with the server 108. Each engine 102b, 104b, 106b is an individual point of sale device that provides a sale function, for example, a retail device such as a printer, customer display, scales, MSR or other.

Figure 2A:
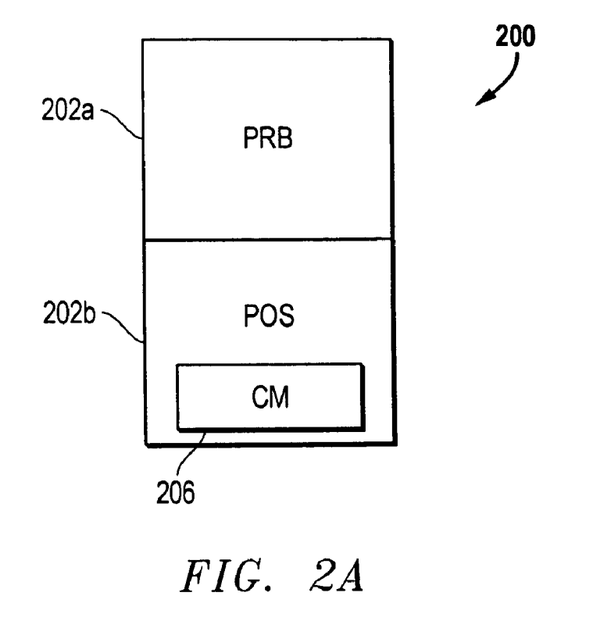
FIGS. 2A-B illustrate point of sale interface devices, including a point of sale engine for connection to a sale functional component and a backplane interface connected to the functional device, the devices including a cooling module and a maintenance module and RF unit, the RF unit serving to communicate wirelessly over a wireless network, for purposes of maintenance, monitoring, download, upload, upgrade and others, according to certain embodiments of the invention.

Referring to FIG. 2a, a point of sale device 200, of the type of the devices 102, 104, 106 of FIG. 1, includes a PRB 202a connected to a point of sale engine 202b. The point of sale engine 202b includes therewith a cooling module 206. The cooling module 206 maintains environmental protection for the device 200, for example, by preventing overheating of the device 200. Overheating of point of sale devices has been particularly problematic because of confined spaces and the like in which the devices are often located and positioned. The cooling module 206 provides cooling functionality to the device 200 in order to limit possibility of overheating of the device 200, notwithstanding the location of the device 200 in typical locations and positions.

Figure 2B:
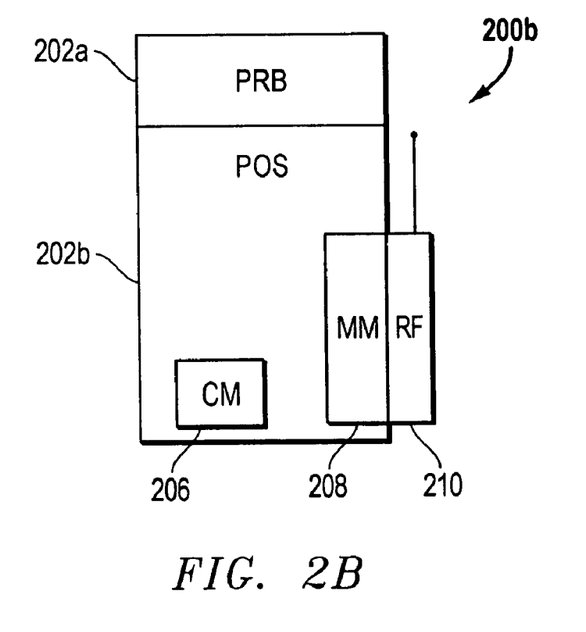

Referring to FIG. 2b, additionally, the device 200 (referred to as 200b in FIG. 2b) can include a communications module 208. The communications module 208 provides independent communications capability to the device 200b, over channels other than the connections of the device 200, 200b to the server 108 (shown in FIG. 1). The communications module 208 is connected to a radio frequency (RF) unit 212, or other transmission and reception element. For example and as hereinafter more fully described, the communications module 208 an RF unit 210 provide wireless communications capability or other communications capability over fixed, wired, wireless, optical or other communications links. The independent communications capability provided by the communications module 208 and RF unit 210 can serve for maintenance, monitoring, and similar and other functions and operations of the device 200.

Figure 3:
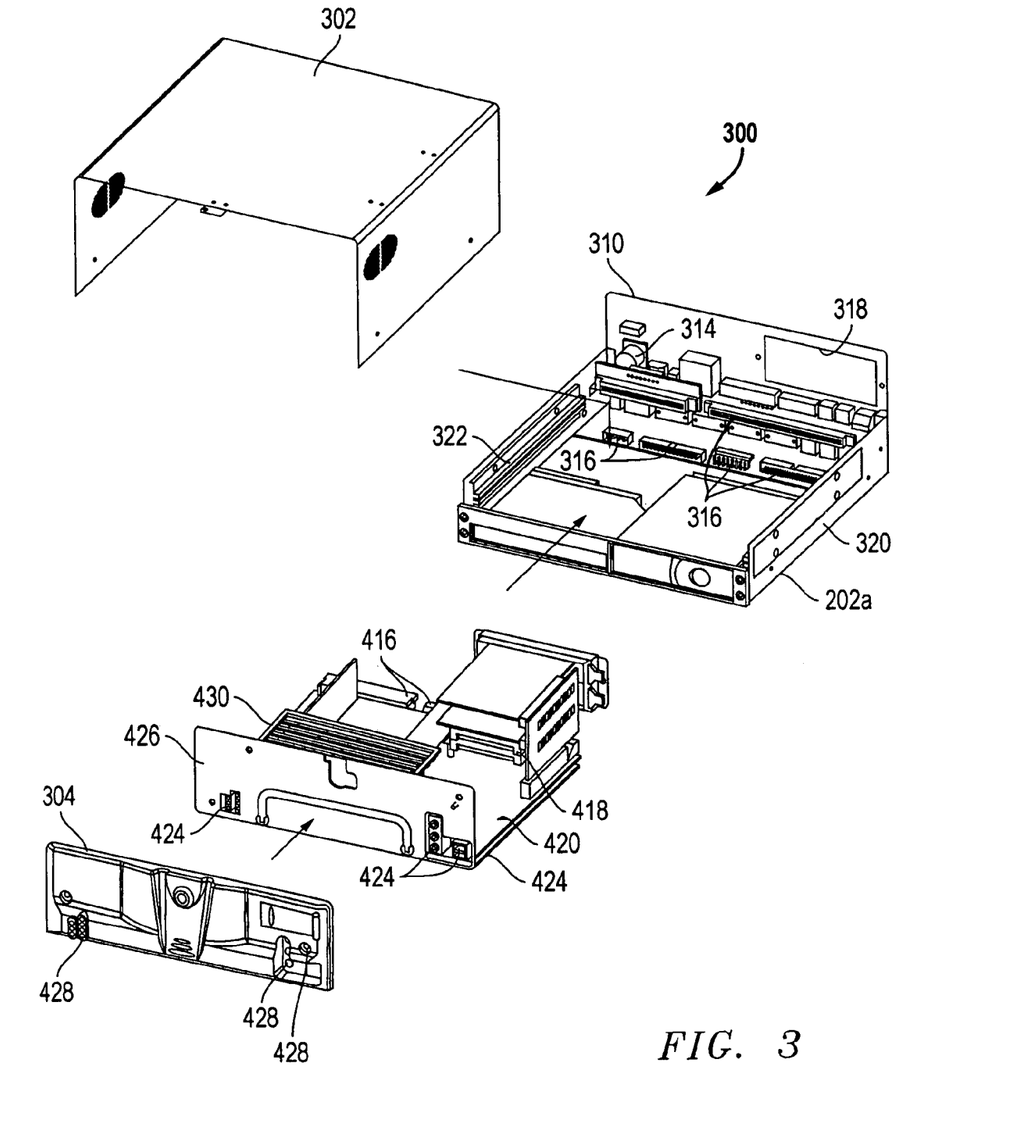
FIG. 3 illustrates an exploded view of the point of sale interface devices of FIGS. 2A-B, including as the interface a passive retail backplane and a point of sale engine, enclosed in a housing, the point of sale engine being removable and replaceable from the passive retail backplane, according to certain embodiments of the invention.

Referring to FIG. 3, the point of sale device 200 of FIG. 2a is illustrated in exploded view of the device 300 to include the PRB 202a and the engine 202b. The PRB 202a forms a chassis that serves to accept and connect to the engine 202b. The engine 202b joins with the PRB 202a, as hereafter described. A housing 302 encloses the engine 202b and PRB 202a complex. A hinged access cover 304 fits with and locks to a front side of the engine 202b and PRB 202a complex.

The PRB 202a includes a printed circuit board that is a mothercard 310. The mothercard 310 retains therein a processor 314, as well as applicable circuitry and other components for digital computing operations of the processor, such as circuitry, connectors, storage, memory, and others. Additionally, the mothercard 310 includes or connects to various connectors 316. The connectors 316 are arranged to mate with complementary connectors 416 of the engine 202b. Certain of the connectors 316 are also mateable with peripheral devices and communications links. For example, the connectors 316 can connect to conventional printer, monitor, display, readers, and other equipment. Moreover, the connectors 316 can connect to telephone or CAT cables or other communications links, including, for example, connecting links to the server 108 (shown in FIG. 1) and similar equipment, devices, and operational functions.

The mothercard 310 is formed with a portal 318. The portal 318 serves to provide access to the engine 202b, when the engine 202b is incorporated and fixed in connection with the PRB 202a. The portal 318, for example, permits access from outside the device 300 to disc and other storage or operational components 418 and functions of the engine 202b.

The mothercard 310 is fixed with a chassis 320 of the PRB 202a. The chassis 320 fixedly retains the mothercard 310, and also includes a sliding engagement 322. The sliding engager 322 accomodates and retains the engine 202b in connection to the mothercard 310 and the entire PRB 202a. Additionally, the PRB 202a can include features for locking and attachment of the engine 202b to and with the PRB 202a, as well as other features for the interconnection therewith.

The engine 202b is formed of an engine frame 420. The engine frame 420 is slidably engageable and fixable within the sliding engager 322 of the PRB 202a. The frame 420 is fixed with storage, disk drive and similar components 418. The frame 420 includes the connectors 416 for mating with the corresponding connectors 316 of the PRB 202a. The frame 420 also includes appropriate circuitry and components to permit interconnectivity of point of sale functional elements and devices. For example, the frame 420 can be incorporated with a display, print, or other element and functionality.

Additionally or alternatively, the frame 420 includes external connectors 424 for such point of sale functional elements and devices and other types of devices as desired. The frame 420 forms a front-end panel 426 at an end of the frame 420. The panel 426 attaches and fixes to the hinged access cover 304. The cover 304 can itself be formed with various throughways 428 and other features, as desired and applicable for the application, including for external access to electrical and other external connectors 424 and the like.

The engine 202b includes a cooling unit 430 attached to the frame 420 of the engine 202b. The cooling unit 430 is electrically connected to the PRB 202a, when the engine 202b is slidably engaged and incorporated to the PRB 202a. The cooling unit 430 cools the device 300, to prevent overheating of the device 300 during operations. The cooling unit 430 is hereinafter described in further detail.

In normal use at a point of sale, the housing 302 locks over the PRB 202a with the engine 202b engaged and attached to the PRB 202a. The housing 302 encloses the unit. The cover 304 attaches to and covers the front-end panel 426 and maintains the enclosure of unit with the housing 302.

In operation, the device 300 operates at a point of sale location, for example, at a customer counter in a retail store. The device 300 is communicatively connected to back-office elements, such as the server 108 (shown in FIG. 1). The device 300, via the PRB 202a, provides a common architecture among multiple ones of the devices connected to the back-office elements. The device 300, via the slidable engagement and connection of the engine 202b with any of a multiple of varieties and configurations of the engine 202b for any particular application and desired operations, provides desired functionality from applicable components and configurations of the engine 202b. For example, the engine 202b can serve to connect to, or to itself function as, a printer, display, or other point of sale device. The engine 202b interfaces to the common architecture of the PRB 202a, notwithstanding the particularities of the engine 202b or any point of sale or other device connected to the engine 202b.

In effect, the PRB 202a is a common feature of all devices of the system 100, and interfaces with the back-office elements in accordance with and a view to open architecture compatibility of the PRB 202a with the back-office elements. Such as the server 108 (or whatever such back-office elements may, in fact, comprise). The engine 202b provides an interface of particular point of sale device functions and elements, such as printer, display, card reader, and others, to the PRB 202a. The engine 202b, thus, varies in configuration and arrangement according to the particular point of sale device functions and elements. However, the PRB 202a remains constant in configuration and operations. As those skilled in the art will know, appreciate and understand, the engine 202b can be replaced, swapped, configured, designed and arranged with other, further or modified devices and functionalities as desired and applicable in each operation to provide particular point of sale function and elements at the point of sale location of the device 300.

Cooling Module

Figure 4:
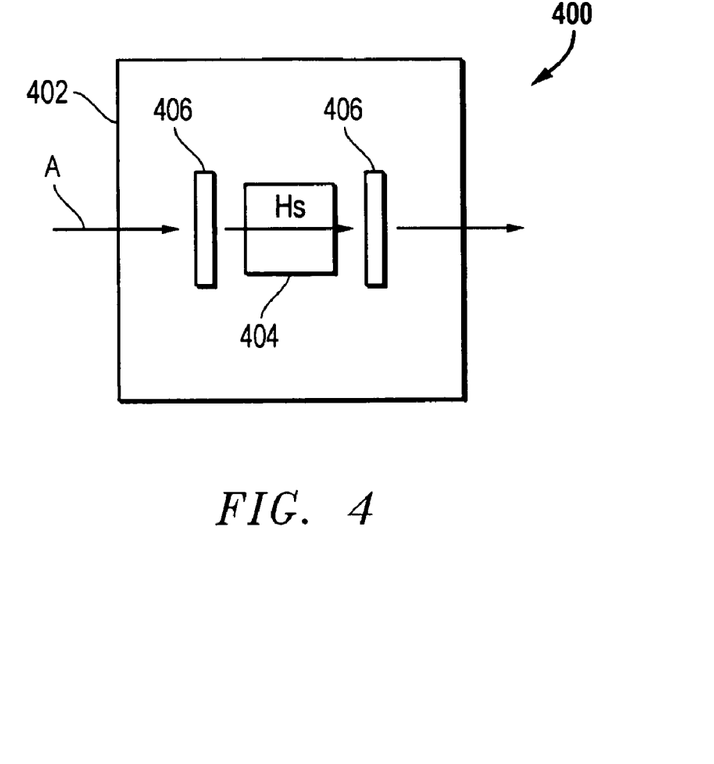
FIG. 4 illustrates a cooling module, including a heat sink and selectively controllable dual fans, according to certain embodiments of the invention.

Referring to FIG. 4, a cooling module 400 includes a circuit board 402 fixed with a heat sink 404 and dual fans 406. The heat sink 404 is a glycol filled heat sink. The fans 406 are each low noise, high performance electronically controlled fans. The fans are arranged in a push-pull configuration on either side of heat sink 404. Air flow across the heat sink 404 flows in the direction "A", such that one fan pulls in air to the heat sink 404, and the other fan directs the air away from the heat sink 404. There is a temperature gradient created between the fans 406, because of the direction A of the air flow caused by the fans 406.

Although not shown in detail in FIG. 4, the cooling module 400 also includes electrical circuitry as desired or required for operations of the fans 406 and the heat sink 404. The cooling module 400 can be employed in the device 300 of FIG. 3 (i.e., as the cooling module 430 of FIG. 3). In such use, the cooling module 400 includes circuitry and connections to electrically connect to and incorporate with the engine 202b of FIG. 3.

Figure 5:
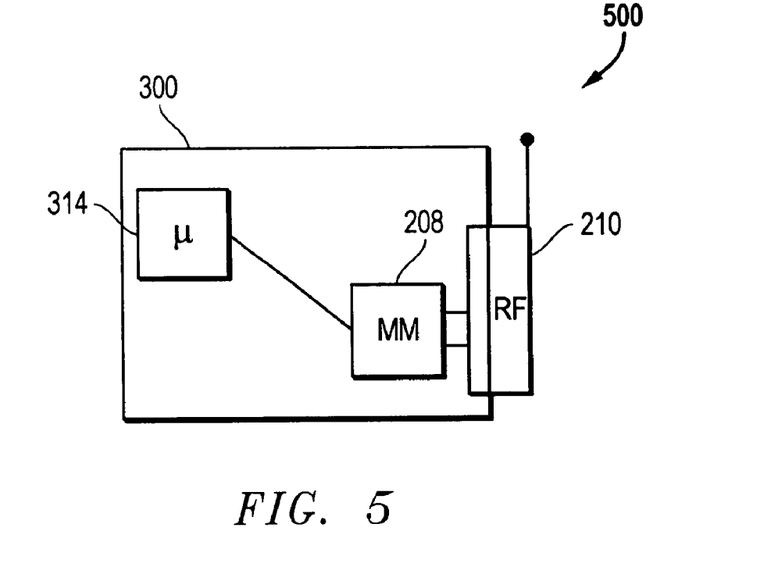
FIG. 5 illustrates a maintenance module of a point of sale interface device of the types of FIGS. 2A-B and 3, including a processor connected to the maintenance module and an RF unit controlled by the processor and the maintenance module, for communicating wirelessly over a wireless network, for purposes of maintenance, monitoring, download, upload, upgrade and others, according to certain embodiments of the invention.

Referring to FIG. 5, a method 500 of operations of the cooling module 400 includes five stages. The stages are controlled, via circuitry and operations of the cooled device, such as the device 300 of FIG. 3, according to a temperature detected for the device. Of course, the cooled device requires a temperature detector or other transducer or detection mechanism, as is known. Processing can be performed by the device, for example, by the processor 314 of the device 300 of FIG. 3 (or otherwise as applicable), to control the method 500 and the five stages. Additionally or alternatively, other techniques and components, as those skilled in the art will know, may be employed to control the method 500 and the five stages.

In the method 500, a first stage 502 is a quiescent or standby mode. In the stage 502, the cooled device is operating at a moderate ambient temperature (i.e., at or below "stage 1 temperature", a core temperature for operations of the device) and normal free air flow passes the cooling module 400. The fans 406 are controlled at an about 25% speed for the stage 502.

A second stage 504 occurs when environmental temperatures are greater and/or substantial cooled device processing operations are occurring causing a higher temperature (i.e., at or below "stage 2 temperature" and above the stage 1 temperature) detected for the cooled device. In the stage 504, the fans 406 are controlled at an about 50% speed. The fan speed at the stage 504 is maintained until a return to the stage 1 temperature is achieved or detected temperature continues to increase and triggers a third stage 506.

In the third stage 506 of the method 500, the detected temperature of the cooled device meets or exceeds a critical load condition for the device, for example, a processor or circuit limit. The third stage 506 occurs when excessively high ambient environmental temperatures are present and/or when high and excessive processing and input/output is being performed by the device causing high detected temperature (i.e., at or below "stage 3 temperature" and above the stage 2 temperature) of the cooled device. In the stage 506, the fans 406 are controlled at an about 75% speed. An internal alarm (if present) of the cooling module 400 can also be initiated, for example, to alert system diagnostics of the cooled device or otherwise. The fan speed at the stage 506 is maintained until a return to the stage 2 temperature is achieved or the detected temperature continues to increase and triggers a fourth stage 508.

In the fourth stage 508, the detected temperature of the cooled device meets or exceeds a critical alarm condition for the device, for example, a processor or circuit threshold that can damage the device. The fourth stage 508 occurs when overly high ambient environmental temperatures are present and/or when exceptional or faulty processor usage is indicated for the device, such that there is an excessive detected temperature (i.e., at or below "stage 4 temperature" and above the stage 3 temperature) of the cooled device. In the stage 508, the fans 406 are controlled at an about 100% speed. An external alarm of the cooling module 400, if present, is sounded to alert an operator. The fan speed at the stage 508 is maintained until a return to the stage 4 temperature is achieved or the detected temperature continues to increase and triggers a fifth stage 510.

In the final and fifth stage 510 of the method 500, a fail safe overload temperature (i.e., at or above "stage 5 temperature") is reached by and detected for the cooled device. At the stage 510, the fans 406 are powered to 130% of normal load and speed. Concurrently therewith, a back-up device, such as what is referred to as a "Peltier Device" (not shown in detail in the Figures), is triggered to gear the fans 406 to max speed and sound a continuous operator-audible alarm. The back-up device is solid state and automatically switches on in the stage 510, upon the occurrence of the stage 5 temperature. The back-up device drives the cooled device temperature down until an operator can determine and resolve the cause of the overload temperature.

Point of Sale Wireless Monitor

Referring to FIG. 5, in conjunction with FIG. 2b, a device 500 is the device 300 of FIG. 3 including a maintenance module 208 and RF unit 210 as described with respect to FIG. 2b. The maintenance module 208 is communicatively connected to the processor 314 of the device 300. The maintenance module 208 is implemented in hardware, software, or combinations.

In operations, the maintenance module 208 operates in coordination and consistent with the device 300. The maintenance module 208 detects changes in state occurring in the device 300, for example, changes in input, storage, processing functionality and software, and other changes in state. If and when the maintenance module 208 detects the change in state, the maintenance module 208 compares the detected state with programmed parameters maintained in a library of the module 208. According to programming and design of the maintenance module 208, as desired, the maintenance module 208 initiates signaling from the device 300 to a maintenance gateway (hereinafter described) and to other devices communicatively connected to the device 300 and module 208, as designed and applicable in the configuration.

Figure 6:
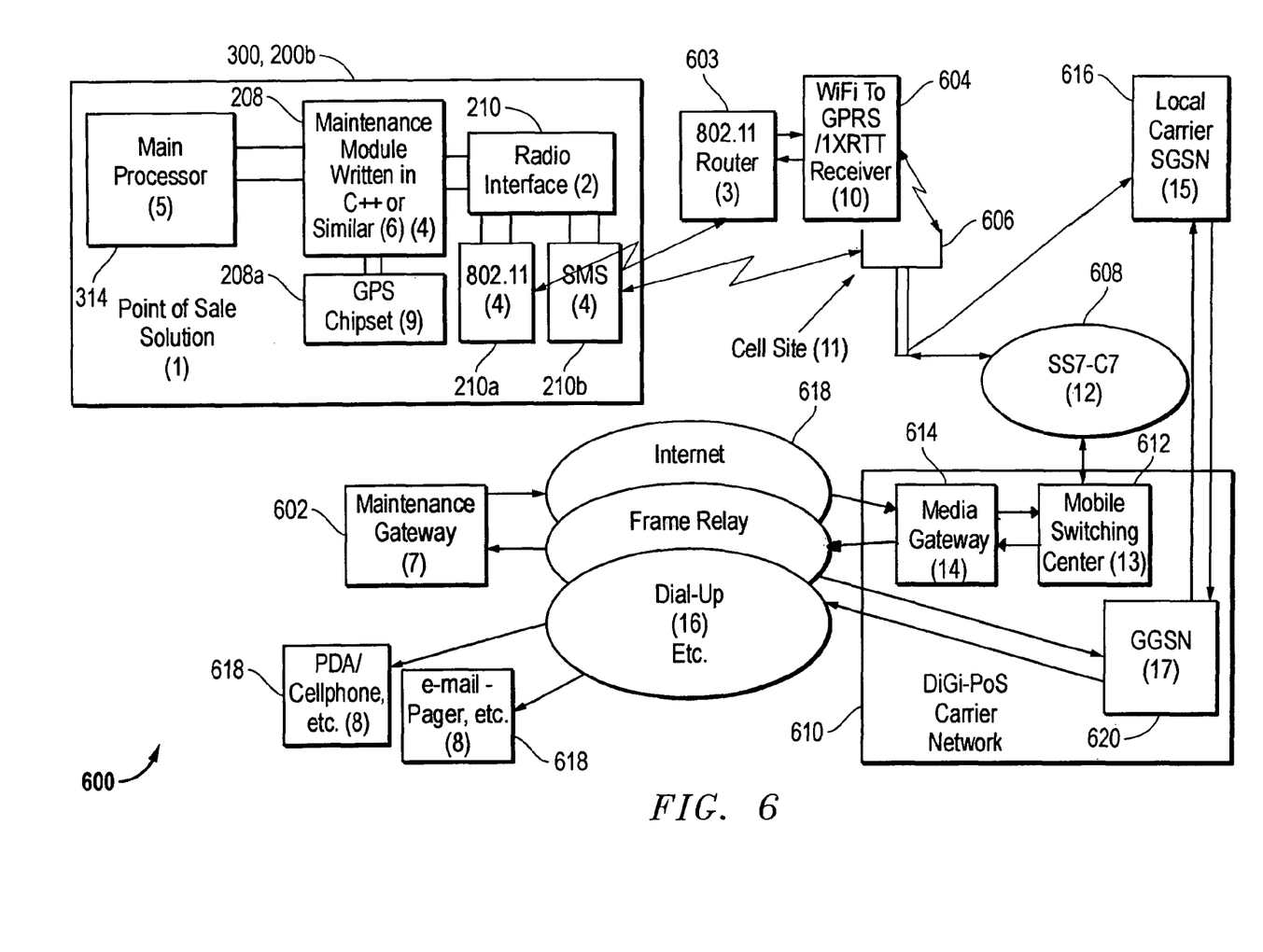
FIG. 6 illustrates a point of sale system, communicatively connected to a wireless network and maintenance gateway accessible through the network, including a point of sale interface device of the types of the foregoing Figures, according to certain embodiments of the invention.

Referring to FIG. 6, a system 600 for wireless monitoring of a point of sale devices in a point of sale system, for example, the devices 102, 104, 106 of the system 100 of FIG. 1, includes a point of sale device 300,200b. The device 300, 200b is substantially as has been previously described, and includes a processor 314, connected to a maintenance module 208, connected to a RF unit 210. The maintenance module 208 connects to, or includes therein, a chipset 208a, such as a GPS chipset. The RF unit 210 includes radio frequency communication equipment and functions, for example, 802.11 features 210, SMS features 210b, or others (e.g., WiFi, SMS, GPRS, 1EV, CDPD, Bluetooth or other).

Dual wireless paths can be included, as illustrated in FIG. 6. Additionally, two radio devices can be connected concurrently for communications. The maintenance module 208 can be designed and programmed to decide, based on various parameters, including such as signal strength, data size, speed, type of data, and others, the appropriate radio device and/or wireless path for communications for maintenance and monitoring purposes, at each instant.

In operations of wireless communications by the device 300, 200b, the processor 314 controls the maintenance module 308 to detect a change in a state at or of the device 300, 200b. The maintenance module 308, based on design and programming, detects and determine the change in state. The maintenance module 208, upon detecting change in state, compares the state with preset allowed parameters within the library of the module 208. If communications are required because of the change in state, then the module 208 initiates and controls sending of applicable data as further described here. If, based on design and programming of the module 208 and chipset 208a, the state of the device requires that RF communications be made, such as, for example, for monitoring or maintenance purposes with respect to the device 300, 200b, the RF unit 210 communicates wirelessly, via the 802.11 features 210a, the SMS features 219b or otherwise (e.g., WiFi, SMS, GPRS, 1EV, CDPD, Bluetooth or other).

Moreover, maintenance functions can be performed on and to the device 300, 200b by wireless communications into the RF unit 210 of the device 300, 200b. For example, wireless communications regarding maintenance made to the RF unit 210 permit access to the device 300, 200b and downloading upgraded software, adjusting parameters of the device 300, 200b, and other operations directed to the device 300, 200b.

In operations, the maintenance module 208 initiates a status/health check of the device 300, 200b based on a pre-set basis according to design or operator definition. Alternatively, the status/health check of the device 300, 200b is initiated by the module 208 because of communications to the device 300, 200b, such as over wireless paths and via the RF unit 210. Of course, such initiation because of communications to the device 300, 200b can occur in a set, programmed or ad-hock manner, and in every event requires security compliance and measures at the device 300, 200b for the incoming communications to the device 300, 200b.

Additionally, the maintenance module 208 can connect to a GPS chipset 208a of the device 300, 200b. The maintenance module 208 can thereby wirelessly (or otherwise) provide locational information for the device 300, 200b. The information can be communicated on demand or report, via wireless transmission via the RF unit 210. Such locational information by means of GPS can provide security, location-based event detection, monitoring, and reporting, and other matters. For example, the information and matters may be particularly important in the case of any mobile type of the device 300, 200b.

The RF unit 210, if wirelessly communicating by the 802.11 features 210a, wirelessly communicates with an 802.11 router 603 located in the vicinity of the device 300, 200b sufficient for the communications. The 802.11 router 603 communicates with a WiFi to GPRS/1XRTT receiver 604. The receiver 604 then communicates directly with a cell site 606 of a cellular or other network communications infrastructure (e.g., CDMA, TDMA, GSM, UMTS, AMPS, Satellite, or other). If the RF unit 210 instead wirelessly communicates via the SMS features 210b, then communications are directly made with a cell site 606 of a cellular or other network communications infrastructure (e.g., CDMA, TDMA, GSM, UMTS, AMPS, Satellite, or other). The various cellular or other network communications infrastructure possible in the system 600 are illustrated, for example and explanation, as being either SS7 608 or local carrier SGSN 616, but not limited thereto and include all other possibilities.

The communications infrastructure for the system 600 can also include a proprietary, independent, or segregated carrier network 610, that is connected to and communicates with the other portions of the infrastructure of the system 600, such as the SS7 608 or local carrier SGSN 616 and also other communications networks and paths, such as the Internet 618 (or frame relay, dial-up or other communications connections). The network 610 includes, for example, a mobile switching center 612, a media gateway 614, and a GGSN 620, each communicatively connected to the infrastructure for receptions and transmissions.

In any event, the communications infrastructure communicatively connects the device 300, 200b to a maintenance gateway 602. The maintenance gateway 602 serves to allow maintenance actions and requests to be communicated to the device 300, 200b from a location that can be remote from the location of the device 300, 200b. Communications over the infrastructure between the gateway 602 and the device 300, 200b are bi-directional, if appropriate. The gateway 602, and communications over the infrastructure, enables separate monitoring and maintenance activities from the local operations of the device 300, 200b, such as by a maintenance company or centralized site.

Of course, where the infrastructure includes the Internet 618, or other accessible network communications capability, the maintenance gateway 602 and the device 300, 200b can be accessible, if permitted by design, by other communications devices 618 communicatively connected to the infrastructure. For example, the other devices can include any of a wide variety of possible elements, components, and features, such as PDA, cellphone, e-mail pager, and others. Communications of such devices 618 can be either bi-directional to and from the maintenance gateway 602 and/or the device 300, 200b, uni-directional therewith, and otherwise restricted, limited, or configured.

Numerous alternatives and additions are possible in the foregoing. For example, the communications paths, networks, links, and channels, as well as the devices and functionalities connected thereto, can widely vary in accordance with all past, present and future technologies. As to the wireless paths, all forms of wireless communications are included in the description, even though only certain particular paths and operations are particularly described. Moreover, the describe wireless communications can be wired communications, in whole or part, and any other type of data or information communications infrastructure, function or capabilities. Of course, specific components, elements and functions of the point of sale devices and the point of sale network and systems are possible. All past, present and future devices and features are included, and the foregoing particular devices and features are intended as examples only and not as limitation.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises", "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for connecting one or more point of sale peripheral device at a point of sale for communicative connection to a back-office server performing sale functions, comprising:
    (i) a backplane unit, comprising a chassis including:
        a motherboard;
        a processor connected to the motherboard;
        memory connected to the processor;
        a maintenance module connected to the processor;
        at least one port connector communicatively connected to the processor;
        a communications module connected to the processor capable of communicatively connecting each respective point of sale peripheral device to the back-office server; and
    (ii) a point of sale engine unit, comprising a frame slidably engageable with the backplane unit including:
        at least one plug connector for mating with the at least one port connector when the frame is slidably engaged with the backplane unit;
        a plurality of electrical connectors for connecting, respectively, the one or more point of sale peripheral device, the one or more point of sale peripheral device communicatively connected to the processor of the backplane unit by the at least one plug connector when mated with the at least one port connector on slidable engagement of the point of sale engine unit to the backplane unit;
    (iii) a cooling module of the point of sale engine unit, the cooling module is communicatively connected to the processor by the at least one plug connector on mating with the at least one port connector when the frame of the point of sale engine unit is slidably engaged with backplane unit;
    wherein the cooling module is controlled by the processor of the backplane unit to prevent overheating of the one or more point of sale peripheral device when connected to the point of sale engine unit;
    wherein the maintenance module monitors the one or more point of sale peripheral device when connected to the point of sale engine unit and initiates signaling by the communications module external to the system for maintaining operational the one or more point of sale peripheral device and the system.

2. The system of claim 1,
    wherein the at least one point of sale peripheral device is selected from the group consisting of: analog input device, digital input device, analog output device, digital output device, and combination analog and digital device.

3. The system of claim 1, wherein the maintenance module is controlled by the processor for detecting operational status of the one or more point of sale peripheral device and communicates externally to the system upon operational malfunction of one or more point of sale peripheral device.

4. The system of claim 3, wherein the at least one point of sale peripheral device is selected from the group consisting of: printer, display, input device, scale, card reader, MSR and point of sale element.

5. The system of claim 1, wherein the communications module comprises:
a wireless communications unit communicatively connected to the back-office server; and
wherein the wireless communications unit provides maintenance and backup communication for the one or more point of sale peripheral device via the system.

6. The system of claim 5, further comprising:
a maintenance gateway, separate from the back-office server, for maintaining operational the one or more point of sale peripheral device and the system, the maintenance gateway communicatively connects to the maintenance module via a communications link selected from the group consisting of: TCP/IP network, digital packetized network, local cable, wireless channel, radio frequency (RF) link, 802.11 channel, cellular channel, and combinations.

7. The system of claim 6, wherein the maintenance gateway communicates with the back-office server to operationally maintain the one or more point of sale peripheral device and the system.

8. The system of claim 1, wherein the cooling module comprises:
a circuit;
a heat sink connected to the circuit;
a first fan connected to the circuit for directing air flow towards the heat sink; and
a second fan connected to the circuit for directing air flow from the heat sink.

9. The system of claim 8, wherein the processor controls the first fan and the second fan for operationally maintaining the one or more point of sale device; and
wherein the processor, responsive to communications by the communications module upon detection by the maintenance module of operational malfunction of either of the one or more point of sale peripheral device and the system, selectively varies control of the first fan and the second fan.

10. The system of claim 9, further comprising:
a power source connected to the backplane unit, the backplane unit supplying power to the first fan, the second fan and the processor;
wherein the processor selectively controls the first fan and the second fan by varying a power to the first fan and a power to the second fan in five increments comprising:
a first increment, selected if the one or more point of sale peripheral device is operating at an ambient temperature;
a second increment, selected if the one or more point of sale peripheral device is operating at an excess temperature exceeding the ambient temperature and not exceeding an overheat temperature;
a third incremented, selected if the one or more point of sale peripheral device is operating at in excess of the overheat temperature and not exceeding a damage temperature;
a fourth increment, selected if the one or more point of sale peripheral device is operating at in excess of the damage temperature and less than a back-up temperature; and
a fifth increment, selected for operating if the one or more point of sale peripheral device is then operating at the back-up temperature of the point of sale peripheral device.

11. The system of claim 10, further comprising:
a Peltier device connected to the one or more point of sale peripheral device;
wherein the Peltier device operates in the fifth stage.

12. A method for connecting one or more point of sale peripheral device at a point of sale for communicative connection to a back-office server performing sale functions, comprising the steps of:
locating a point of sale (POS) unit at the point of sale, the POS unit comprising:
a backplane unit, comprising a chassis including a motherboard, a processor connected to the motherboard, memory connected to the processor, a maintenance module connected to the processor, at least one port connector communicatively connected to the processor, and a communications module connected to the processor and communicatively connected to the back-office server for communicating according to the network protocol;
(ii) an engine unit, comprising a frame slidably removably connected to the backplane unit, including: a passive interface of at least one plug connector mated with the at least one port connector of the backplane unit by slidable removable connection of the engine unit to the backplane unit and a plurality of electrical connectors for connecting respective ones of the one or more point of sale peripheral device to the at least one plug connector; and
(iii) a cooling module of the engine unit communicatively connected to the processor by the at least one plug connector
controlling the cooling module by the processor to prevent overheating of the one or more point of sale peripheral device of the engine unit;
detecting a maintenance state of the one or more point of sale peripheral device by the maintenance module;
communicating by the communications module of the backplane unit over a communications network, in response to the step of detecting;
receiving a maintenance instruction by the communications module of the backplane unit from the communications network, in response to the step of communicating; and
performing maintenance by the maintenance module to at least one point of sale peripheral device, in response to the step of receiving.

13. The method of claim 12, wherein the step of
communicating is performed via communications over a wireless communications network.

14. The method of claim 13, further comprising the step of:
selectively cooling the POS unit via dual fans and a heat sink of the engine unit controlled by the processor in conjunction with the maintenance module and the communications module.

15. The system of claim 1, wherein
the communications module communicates over a wireless communication network in response to monitoring by the maintenance module to maintain operational the one or more point of sale peripheral device and the system and to cooling by the cooling module to prevent overheating of the one or more point of sale peripheral device and the system.

16. The device of claim 15, wherein
the cooling module includes at least one fan connected to the processor for cooling the one or more point of sale device;
wherein the processor controls the at least one fan to prevent overheating.

17. A method of controlling a point of sale system, comprising the steps of:
- locating a sale function component at a point of sale;
- wirelessly monitoring a state of the component; and
- varying an operation of the sale function component in response to the step of wirelessly monitoring the state.

18. A method of cooling a device operating via power, the device having a varying temperature in operation, comprising the steps of
- first incrementing the power in response to an indicator of an ambient temperature of the device;
- second incrementing the power in response to an indicator of an excess temperature exceeding the ambient temperature of the device and not exceeding an overheat temperature of the device;
- third incrementing the power in response to an indicator of in excess of the overheat temperature and not exceeding a damage temperature of the device;
- fourth incrementing the power in response to an indicator of in excess of the damage temperature and less than a back-up temperature of the device;
- fifth incrementing the power in response to an indicator of at least the back-up temperature of the device;
- controlling the steps of first incrementing, second incrementing, third incrementing, fourth incrementing, and fifth incrementing by wireless communications with the device;
- monitoring the varying temperature of the device at a location remote from the device, through wireless communications with the device; and
- varying the step of controlling at the location remote from the device by wireless communications with the device.

19. The system of claim 3, further comprising:
- a plurality of POS devices communicatively connected to the server; and
- at least one point of sale peripheral device connected to each one of the plurality of POS devices;
- wherein each of the plurality of POS devices communicates with the server according the network protocol;
- wherein the server communicative with each one of the POS devices to monitor the respective at least one point of sale peripheral device connected to each the one of the plurality of POS devices.

20. The system of claim 19, wherein the server communicates with each one of the plurality of POS devices via the group consisting of RF channel, cellular wireless channel, local wireless data channel, POTS, optical channel, infrared connection, wired connection, and more than one of the group.

21. The system of claim 20, further comprising:
- a communications module of each one of the plurality of POS devices for communicatively connecting with the server; and
- a maintenance module of each respective one of the plurality of POS devices, connected to the communications module of the respective one of the plurality of POS devices, for detecting state of the respective at least one point of sale peripheral device connected to each one of the plurality of POS devices.

22. The system of claim 21, further comprising:
- a respective cooler of each respective one of the plurality of POS device, connected to the respective one of the plurality of POS devices, specially adapted for cooling the respective one of the plurality of POS devices in confined location during point of sale operations, according to varying temperature state of each at least one peripheral device for the respective one of the plurality of POS devices during operations.

23. The method of claim 18, further comprising the steps of:
- wirelessly communicating between the device and a separate device remotely located from the device;
- wherein the step of controlling further comprises:
  - wirelessly communicating between the device and the separate device.

* * * * *